United States Patent
Gross

(10) Patent No.: US 11,230,494 B2
(45) Date of Patent: *Jan. 25, 2022

(54) ION EXCHANGED GLASS WITH HIGH RESISTANCE TO SHARP CONTACT FAILURE AND ARTICLES MADE THEREFROM

(71) Applicant: CORNING INCORPORATED, Corning, NY (US)

(72) Inventor: Timothy Michael Gross, Corning, NY (US)

(73) Assignee: CORNING INCORPORATED, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/011,499

(22) Filed: Sep. 3, 2020

(65) Prior Publication Data
US 2021/0024404 A1 Jan. 28, 2021

Related U.S. Application Data

(63) Continuation of application No. 16/402,638, filed on May 3, 2019, now Pat. No. 10,766,811, which is a (Continued)

(51) Int. Cl.
*C03C 3/091* (2006.01)
*C03C 21/00* (2006.01)
(Continued)

(52) U.S. Cl.
CPC ............ *C03C 21/002* (2013.01); *C03C 3/091* (2013.01); *C03C 3/097* (2013.01); *C03C 10/0018* (2013.01)

(58) Field of Classification Search
CPC ... C03C 10/0018; C03C 21/002; C03C 3/091; C03C 3/097
See application file for complete search history.

(56) References Cited

U.S. PATENT DOCUMENTS

| 3,653,862 A | 4/1972 | Lynch |
| 4,130,595 A | 12/1978 | Bellis |

(Continued)

FOREIGN PATENT DOCUMENTS

| CN | 102123960 A | 7/2011 |
| TW | 219354 B | 1/1994 |

OTHER PUBLICATIONS

International Search Report and Written Opinion of the International Searching Authority; PCT/US2012/051293; dated Jan. 18, 2013.

(Continued)

*Primary Examiner* — Lawrence D Ferguson
(74) *Attorney, Agent, or Firm* — Kevin M. Johnson

(57) ABSTRACT

An article comprising an ion-exchanged glass material that prevents sharp contact flaws from entering a central region of the material that is under central tension and thus causing failure of the material. The glass material may be a glass or glass ceramic having a surface layer under compression. In some embodiments, the depth of the compressive layer is greater than about 75 µm. The greater depth of layer prevents flaws from penetrating the compressive layer to the region under tension.

24 Claims, 5 Drawing Sheets

Related U.S. Application Data continuation of application No. 13/584,902, filed on Aug. 14, 2012, now Pat. No. 10,280,112.

(60) Provisional application No. 61/525,393, filed on Aug. 19, 2011.

(51) Int. Cl.
  *C03C 3/097* (2006.01)
  *C03C 10/00* (2006.01)

(56) References Cited

U.S. PATENT DOCUMENTS

| | | | |
|---|---|---|---|
| 4,310,595 A | 1/1982 | Beall et al. | |
| 8,586,492 B2 | 11/2013 | Barefoot et al. | |
| 9,156,724 B2 | 10/2015 | Gross | |
| 10,280,112 B2 * | 5/2019 | Gross | C03C 3/091 |
| 10,766,811 B2 * | 9/2020 | Gross | C03C 21/002 |
| 2010/0009154 A1 | 1/2010 | Allan et al. | |
| 2010/0047521 A1 | 2/2010 | Amin et al. | |
| 2010/0206008 A1 | 8/2010 | Harvey et al. | |
| 2010/0291353 A1 | 11/2010 | Dejneka et al. | |
| 2011/0201490 A1 | 8/2011 | Barefoot et al. | |
| 2012/0135226 A1 | 5/2012 | Bookbinder et al. | |

OTHER PUBLICATIONS

International Searching Authority; International Search Report; dated Aug. 17, 2012; pp. 1-4.

Morris et al.; "Indentation Crack Initiation in Ion-Exchanged Aluminosilicate Glass"; COPYRGT. 2004 Kluwer Academic Publishers; pp. 2399-2410.

Sglavo et al.; "Engineered Stress-Profile Silicate Glass: High Strength Material Insensitive to Surface Defects and Fatigue"; 2004; Advanced Engineering Materials 2004, 6, No. 5; pp. 344-349.

TW101129748 Search Report dated Jan. 15, 2016.

U.S. Appl. No. 13/678,013, filed Nov. 15, 2012, Gross, Timothy Michael.

\* cited by examiner

ION EXCHANGED GLASS WITH HIGH RESISTANCE TO SHARP CONTACT FAILURE AND ARTICLES MADE THEREFROM

This application is a continuation of U.S. patent application Ser. No. 16/402,638 filed on May 3, 2019, which is a continuation of U.S. patent application Ser. No. 13/584,902 filed on Aug. 14, 2012, which claims the benefit of priority under 35 U.S.C. § 119 of U.S. Provisional Application Ser. No. 61/525,393, filed on Aug. 19, 2011, the content of each is relied upon and incorporated herein by reference in its entirety.

BACKGROUND

The disclosure relates to articles made from strengthened glass materials. More particularly, the disclosure relates to articles made from strengthened glass materials that are resistant to damage caused by sharp contact flaws.

Glass materials, such as glasses and glass ceramics, are widely used in applications such as viewing windows, touch screens, and external housings for various electronic devices. When used in these and other applications, glass materials are subject to impact, abrasion, and other damage-causing events that may lead to catastrophic failure of the material. To prevent such failure, the major surfaces of these glass materials are sometimes strengthened by either thermal or chemical means to provide surface layers that are under compressive stress.

Compressive layers are most effective in preventing the propagation of flaws resulting from bending. However, failure analysis of such articles indicate that bending stresses during failure of such devices during use is minimal.

SUMMARY

The present disclosure provides an ion-exchanged glass material that prevents sharp contact flaws from entering a central region of the material that is under central tension, and articles made therefrom. The glass material may be a glass or glass ceramic having a surface layer under compression. In some embodiments, the depth of the compressive layer is greater than about 75 μm. The greater depth of layer prevents flaws from penetrating the compressive layer to the central region under tension.

Accordingly, one aspect of the disclosure is to provide an article comprising a glass material. The glass material has a thickness of less than about 1.5 mm, a compressive layer extending from a surface of the glass material to a depth of layer of at least 75 microns (μm). The glass material has an inner central region under a tension of up to about 75 MPa, and a Vickers crack initiation threshold of at least about 10 kgf, wherein the compressive layer is under a surface compressive stress of at least 250 MPa.

Another aspect of the disclosure is to provide a method of strengthening a glass material. The method comprises: providing an ion exchange medium, the ion exchange medium comprising a first cation having a first concentration and a second cation having a second concentration, wherein the first concentration is greater than the second concentration, and wherein the first cation is larger than the second cation; providing a glass material comprising the second cation; and ion exchanging the second cations in the glass material with the first cations in the ion exchange medium, wherein ion exchanging the first cations with the second cations forms a layer under a compressive stress, the layer extending from a surface of the glass material to a depth of layer of at least 75 μm, and wherein the glass material, after ion exchange, has a Vickers crack initiation threshold of at least about 10 kgf.

These and other aspects, advantages, and salient features will become apparent from the following detailed description, the accompanying drawings, and the appended claims.

DETAILED DESCRIPTION

Figure 1:
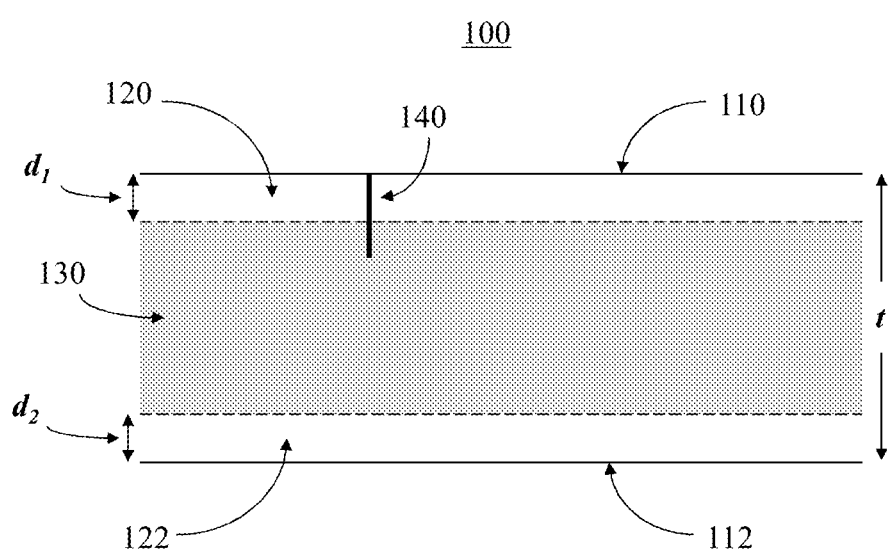
FIG. 1 is a cross-sectional schematic view of a strengthened sheet of a glass material.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Glass materials such as, but not limited to, glasses and glass ceramics are widely used in applications such as viewing windows, touch screens, external housings, and the like for various electronic devices. These electronic devices include portable communication and entertainment devices, laptop computers, televisions, and the like.

When used in these and other applications, glass materials are subject to impact, abrasion, and other damage-causing events that may lead to catastrophic failure of the material. To prevent such failure, the major surfaces of these glass materials are typically strengthened by either thermal or chemical means to provide surface layers that are under compressive stress. In many instances, chemical strengthening of such glass materials is achieved through ion exchange of the material.

In the ion exchange process, larger cations are introduced into the surface layer of the glass and replace (or are "exchanged" with) smaller cations having the same valence/charge/oxidation state. The increased cation size in the glass network places the surface under compression; i.e., the replacement of smaller cations with larger cations forms a layer under compressive stress (compressive layer) that extends from the surface of the glass material to a depth of layer (DOL). For example, potassium ions may be introduced into a sodium-containing glass, where the larger $K^+$ cations replace smaller $Na^+$ cations, thus forming a compressive layer at the surface of the glass. To balance or compensate for the compressive stress at the surface, a tensile stress arises in the inner or central region of the glass material.

Ion exchange of such glass materials is often achieved by immersing the glass material in an ion exchange bath comprising a salt of the larger cation. The ion exchange bath is typically heated to a temperature at which the salt is molten, but below the strain and anneal points of the glass material. The ion exchange bath may also comprise other salts such as, for example, salts of the cation that is removed from or replaced in the glass material.

A cross-sectional schematic view of a strengthened sheet of glass material is shown in FIG. 1. Article 100 has a thickness t, first surface 110, and second surface 112. Article 100, in some embodiments, has a thickness t of up to about 1.5 mm. While the embodiment shown in FIG. 1 depicts article 100 as a flat planar sheet or plate, article 100 may have other configurations, such as three dimensional shapes or non-planar configurations. Article 100 has a first compressive layer 120 extending from first surface 110 to a depth of layer (DOL) $d_1$ into the bulk of the glass article 100. In the embodiment shown in FIG. 1, article 100 also has a second compressive layer 122 extending from second surface 112 to a second depth of layer $d_2$. Article 100 also has a central region 130 that extends from $d_1$ to $d_2$. Central region 130 is under a tensile stress or central tension (CT), which balances or counteracts the compressive stresses of layers 120 and 122. The depth $d_1$, $d_2$ of first and second compressive layers 120, 122 protects the glass article 100 from the propagation of flaws introduced by sharp impact to first and second surfaces 110, 112 of glass article 100, while the compressive stress reduces the likelihood of a flaw penetrating through the depth $d_1$, $d_2$ of first and second compressive layers 120, 122. Catastrophic failure of article 100 occurs when a flaw 140 penetrates depth of layer $d_1$ into—and propagates through—central region 130. Once flaw 140 surpasses depth of layer $d_1$, it continues to extend under the tensile stress present in central region 130.

The magnitude of compressive stress within first and second compressive layers 120, 122 has been believed to be critical to preventing failures of such glass materials, particularly in the applications that have been previously been described hereinabove. Compressive layers are most effective in preventing the propagation of flaws resulting from bending. As described herein, however, fractographic analyses of failures of such articles formed from strengthened glass materials indicate that bending stresses during failure of such devices during use is minimal.

As described in detail in the instant disclosure, it has been discovered that failure of articles formed from such glass materials during use instead occurs when the flaw depth exceeds the depth of layer; e.g., flaw 140 (FIG. 1) extends beyond the depth $d_1$ of compressive layer 120 into central region 130. Once the flaw depth penetrates the compressive layer, the flaw enters the central region (130 in FIG. 1), which is under central tension. The flaw will then typically continue to penetrate through the central region to depths that are several times greater than the depth of layer.

Examples that illustrate that failure of articles formed from such glass materials occurs when the flaw depth exceeds the depth of layer are listed in Table 1. Table 1 lists flaw depths that caused in-use failure of articles comprising Corning GORILLA® Glass having a nominal composition of 69.2 mol % $SiO_2$, 8.5 mol % $Al_2O_3$, 13.9 mol % $Na_2O$, 1.2 mol % $K_2O$, 6.5 mol % MgO, 0.5 mol % CaO, and 0.2 mol % $SnO_2$. All samples listed in Table 1 were ion exchanged to a depth of layer of about 50 μm and had a compressive stress of greater than about 650 MPa. As can be seen in Table 1, the measured depth of all flaws exceeded the 50 μm depth of the compressive layer; i.e., failure occurred only when the flaw depth exceeded the depth of the compressive layer. At these flaw depths, failures occur with either with minimal amounts of externally applied stress or by slow extension of these flaws under the tension present in the central region of the glass material.

TABLE 1

Depths of flaws that caused in use failure of glass articles.

| Sample | Flaw Depth (μm) |
| --- | --- |
| a | 192 |
| b | 245 |
| c | 200 |
| d | 158 |
| e | 114 |
| f | 169 |
| g | 177 |
| h | 106 |
| i | 90 |
| j | 52 |
| k | 278 |
| l | 454 |
| m | 86 |
| n | 284 |
| o | 90 |
| p | 73 |

Accordingly, a glass material that is resistant to sharp contact failures and articles made therefrom are provided. The glass material may comprise as a glass, a glass ceramic, or the like, One aspect of the disclosure is to provide an article comprising a strengthened glass material having a surface layer under a compressive stress (compressive layer) and a central region under tensile stress. The compressive layer extends from a surface of the article to a depth of layer, and the central region extends from the depth of layer into the bulk of the glass. The depth of the surface layer under compressive stress is sufficient to prevent sharp contact flaws from penetrating or entering the central region under a tensile stress. In some embodiments, the depth of layer is at least 70 μm and the compressive stress (CS) is at least about 250 MPa. The glass material has a Vickers crack initiation threshold, of at least about 5 kgf. In other embodiments, the glass material has a Vickers crack initiation threshold of at least about 10 kgf and, in still other embodiments, at least about 20 kgf. Vickers indentation cracking threshold measurements described herein are performed by applying and then removing an indentation load to the glass surface at 0.2 mm/min. The indentation maximum load is held for 10 seconds. The indentation cracking threshold is defined at the indentation load at which 50% of 10 indents exhibit any number of radial/median cracks emanating from the corners of the indent impression. The maximum load is increased until the threshold is met for a given glass composition. All indentation measurements are performed at room temperature in 50% relative humidity.

In another aspect, the strengthened glass materials described herein have a central region that is under a tensile stress (also referred to herein as "central tension" or "CT"). The relationship between CS and CT is given by the expression:

$$CT = (CS \cdot DOL)/(t - 2\, DOL),$$

where t is the thickness of the glass article. In the above equation, central tension CT and compressive stress CS are expressed herein in megaPascals (MPa), and the thickness t and depth of layer DOL are expressed in millimeters. In the glass materials and articles made therefrom described herein, the central tension is less than or equal to the frangibility limit of the strengthened glass material. As used herein, the "frangibility limit" refers to the central tension above which the article comprising the glass material exhibits frangible behavior, and "frangibility" and "frangible behavior" refer to the energetic fragmentation or crazing of a glass or glass material into a large number of small pieces. As described in U.S. Published Patent Application No. 2010/0009154 A1, the terms "frangible" and "frangibility" refer to the energetic fracture of a glass plate or sheet, when subjected to a point impact by an object or a drop onto a solid surface with sufficient force to break the glass plate into multiple small pieces, with either multiple crack branching (i.e., greater than 5 multiple cracks branching from an initial crack) in the glass, ejection of pieces from their original location of at least two inches (about 5 cm), a fragmentation density of greater than about 5 fragments/cm$^2$ of the glass plate, or any combination of these three conditions. Conversely, a glass plate is deemed to be not frangible if it either does not break or breaks with less than five multiple cracks branching from an initial crack with pieces ejected less than two inches from their original location when subjected to a point impact by an object or a drop onto a solid surface with sufficient force to break the glass plate. Similarly, U.S. patent application Ser. No. 12/858,490 describes frangible behavior as being characterized by at least one of: breaking of the strengthened glass article (e.g., a plate or sheet) into multiple small pieces (e.g., 1 mm); the number of fragments formed per unit area of the glass article; multiple crack branching from an initial crack in the glass article; and violent ejection of at least one fragment a specified distance (e.g., 5 cm, or about 2 inches) from its original location; and combinations of any of the foregoing breaking (size and density), cracking, and ejecting behaviors.

Figure 2:
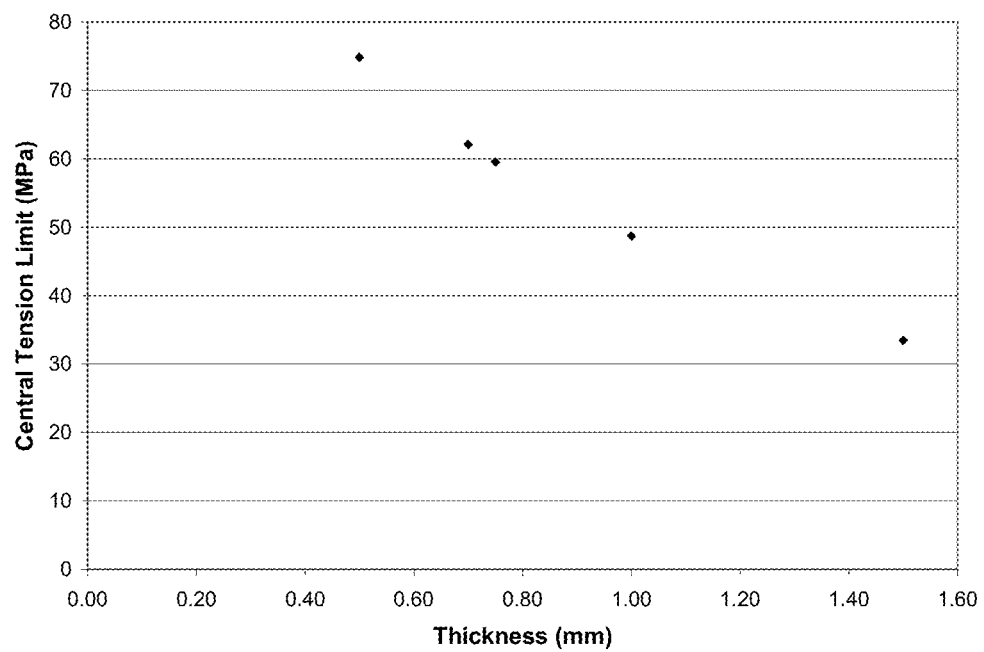
FIG. 2 is a plot of the frangibility limit of a glass as a function of thickness for glass samples.
Figure 3:
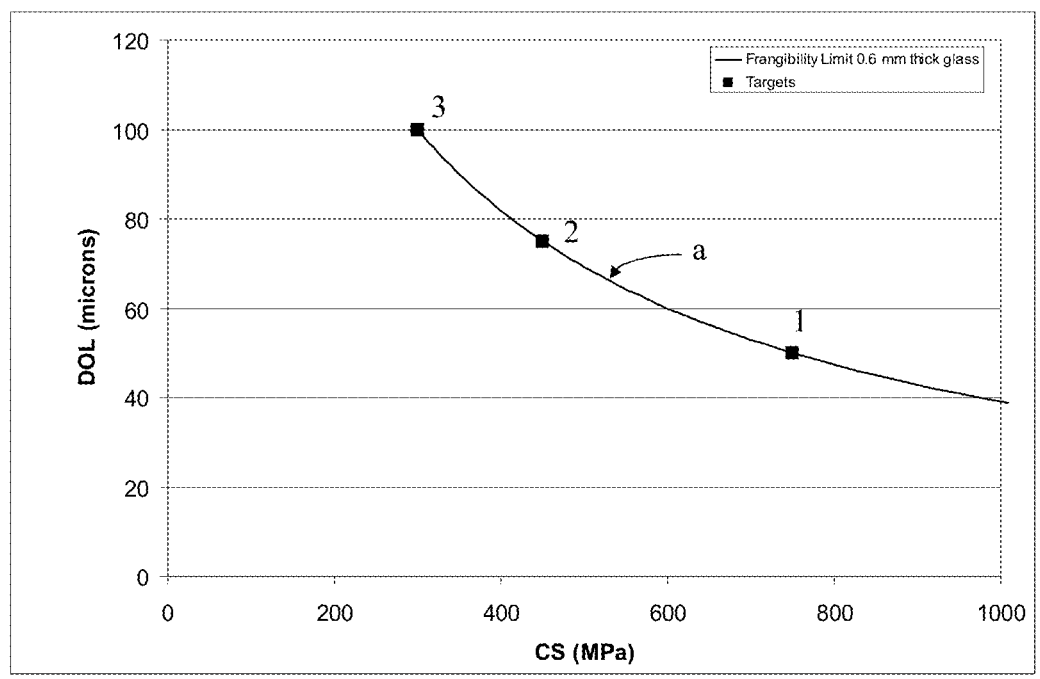
FIG. 3 is a curve defining the frangibility limit of a glass, plotted as a function of compressive stress and depth of layer in FIG. 3 for a thickness of 0.6 mm.

The frangibility limit of the glass material can be empirically determined for glasses or glass materials of a given composition. FIG. 2 is a plot of the frangibility limit (CT Limit in FIG. 2) as a function of sample thickness for glass samples having a nominal composition of 64.4 mol % SiO$_2$, 7.2 mol % B$_2$O$_3$, 13.9 mol % Al$_2$O$_3$, 14 mol % Na$_2$O, 0.5 mol % K$_2$O, 0.1 mol % CaO, and 0.1 mol % SnO$_2$. The empirically determined frangibility limits may then be used to derive an overall expression for the frangibility limit (line a in FIG. 3). The glass material should have central tension that is less than or equal to the frangibility limit of the material. Accordingly, in some embodiments, the frangibility limit of the articles and glass materials described herein is less than about 75 MPa.

To illustrate the effect of depth of layer upon damage resistance, 0.6 mm thick glass samples, each having a nominal composition of 64.4 mol % SiO$_2$, 7.2 mol % B$_2$O$_3$, 13.9 mol % Al$_2$O$_3$, 14 mol % Na$_2$O, 0.5 mol % K$_2$O, 0.1 mol % CaO, and 0.1 mol % SnO$_2$, were ion exchanged to obtain three combinations of compressive stress (CS) and depth of layer (DOL), which were selected along the curve defining the frangibility limit. The curve defining the frangibility limit is plotted as a function of compressive stress and depth of layer for a thickness of 0.6 mm in FIG. 3. Samples in group 1 had a depth of layer of 45 μm and a compressive stress of 744 MPa. These samples were ion exchanged for 13 hours at 390° C. in a pure (100 wt %) potassium nitrate (KNO$_3$) ion exchange bath. Samples in group 2 had a depth of layer of 72 μm and a compressive stress of 467 MPa. These samples were ion exchanged for 8 hours at 390° C. in an ion exchange bath comprising 94 wt % KNO$_3$ and 6% sodium nitrate (NaNO$_3$). Samples in group 3 had a depth of layer of 98 μm and a compressive stress of 345 MPa. These samples were ion exchanged for 24 hours at 390° C. in an ion exchange bath comprising 89 wt % KNO$_3$ and 11% sodium nitrate (NaNO$_3$). Each sample was subjected to abrasion, followed by determination of the load to failure (i.e., crack formation originating at the indent impression) using ring-on-ring testing for each sample. Abraded ring-on-ring failure loads obtained for glass samples were determined by first blasting the surface of the sample to be studied (dimensions are 50 mm×50 mm×0.6 mm thick) with 90 grit silicon carbide (SiC) at a pressure of 5 psi for five seconds. Samples are masked so that the abrasion is limited to a 6 mm diameter circle located at the center of the 50 mm×50 mm faces of the sample. Abrasion of the samples was followed by ring-on-ring load to failure-testing with a 1 inch diameter support ring and a ½ inch diameter loading ring. The sample is placed on the support ring with the abraded side face down, so as to put the abraded region in tension during testing. The load is applied at a rate of 1.2 mm/min. Testing is performed at room temperature in 50% relative humidity. The radius of curvature on the rings is 1/16 inch.

Figure 4:
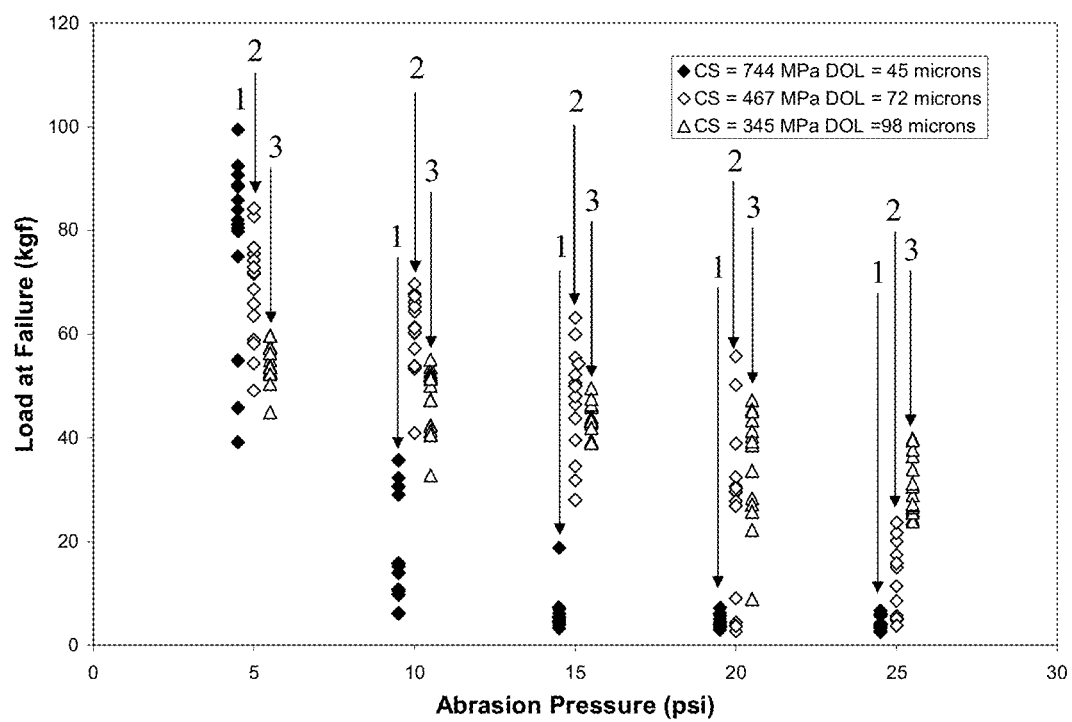
FIG. 4 is a plot of load to failure as a function of abrasion pressure.

Load to failure is plotted as a function of abrasion pressure is plotted in FIG. 4 for the samples described above. Damage becomes more sever with increasing abrasion pressure. Reduced damage resistance, which is indicated by the pressure at which the load to failure shifts significantly downward toward minimal values, begins to occur at 10 psi for those samples having 45 μm DOL (group 1 in FIG. 4). For those samples having a depth of layer of 72 μm (group 2 in FIG. 4), the onset of reduced damage resistance occurs at 20 psi. An abrasion resistance of greater than 25 psi is required for reduced damage resistance to occur in those samples having a depth of layer of 98 μm (group 3 in FIG. 4).

Figure 5:
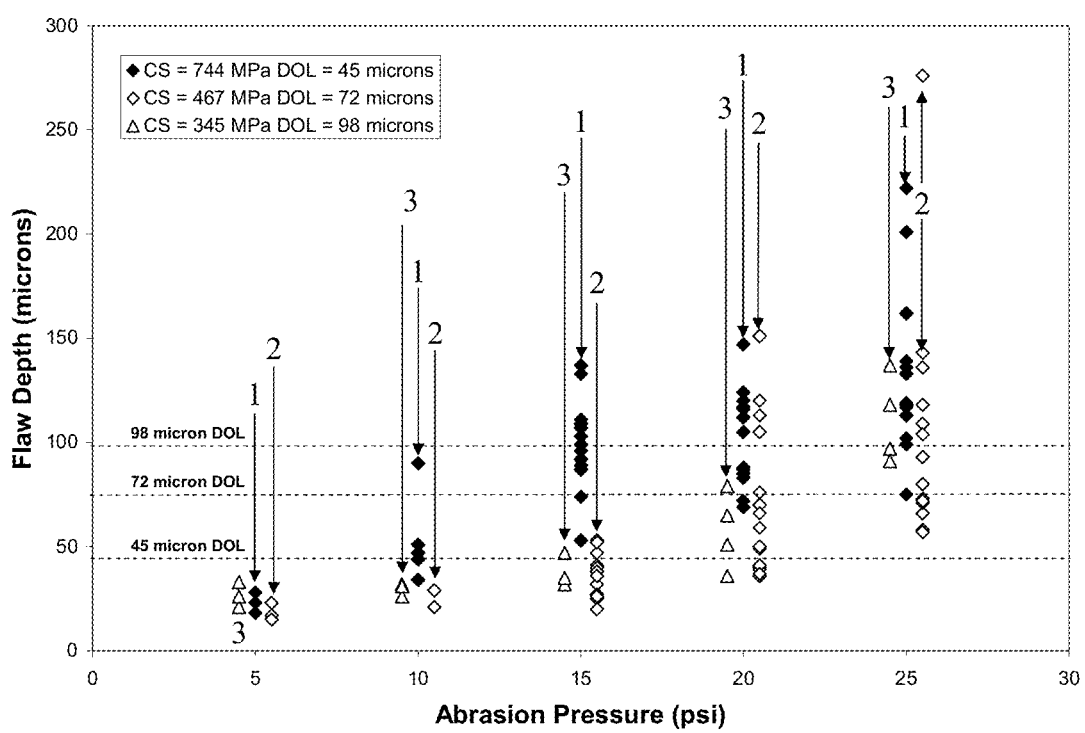
FIG. 5 is a plot of flaw depth as a function of abrasion pressure.

Flaw depth is plotted as a function of abrasion pressure in FIG. 5 for the samples described above. At 10 psi abrasion pressure, flaw depth exceeds the depth of layer for many samples having DOL of 45 μm (group 1). At abrasion pressures greater than 10 kpsi, the flaw depth exceeds the depth of layer for all samples having DOL of 45 μm. For those samples having a depth of layer of 72 μm (group 2), the flaw depth exceeds DOL at abrasion pressures of 20 and 25 psi. For those samples having a depth of layer of 98 μm (group 3), the flaw depth exceeds DOL for several samples at abrasion pressures of 25 psi.

The data plotted in FIG. 4 indicate that when the glass is subjected to more severe contact (i.e., as abrasion pressure increases), the load to failure remains high for glasses having greater depths of layer. FIG. 5 shows that the drop off in load to failure corresponds to pressures that penetrate the depth of the compressive layer. For a given thickness and central tension, glasses having a compressive layer (i.e., greater DOL) are more resistant to sharp contact failure than those having a shallow compressive layer.

Resistance to the formation of strength limiting flaws—i.e., median and/or radial cracks—under wide angle contact such as by a Vickers indenter (136° 4-sided pyramidal indenter) improves with increasing compressive stress CS at depths of layer greater than about 40 μm. In the case of wide angle Vickers indentation, the threshold for flaw formation is much higher for glass with CS=849 MPa and DOL=43 μm, when compared to glass with CS=366 MPa and DOL=100 μm. This is demonstrated in Table 1 by indentation with a Vickers (136°, 4-sided pyramidal indenter) indenter tip.

TABLE 1

Vickers indentation threshold load for the formation of median/radial cracks for alkali aluminoborosilicate glasses with different ion-exchange profiles.

| 0.6 mm glass alkali aluminoborosilicate glass with CS = 849 DOL = 43 Threshold (kgf) | 0.6 mm alkali aluminoborosilicate glass with CS = 366 DOL = 100 Threshold (kgf) |
|---|---|
| 20-25 | 5-6 |

However, resistance to the formation of strength limiting flaws is greatly reduced by contact with sharper indenters, such as, for example, a 100° 4-sided pyramidal indenter tip or by contact by irregularly shaped 90 grit silicon carbide abrasive, as shown in Table 2. Sharp contact promotes a displacive, shearing deformation mechanism that generates greater subsurface damage and higher residual stress, thus leading to reduced threshold loads for median/radial cracking. Since the formation of flaws during sharp contact occurs at low contact loads regardless of CS level, the resistance of central tension-driven glass failure by complete separation of a glass plate into two of more pieces is achieved by containing the strength limiting flaws within the depth of the compressive layer. For example, 500 gf indentation with a 100° 4-sided pyramidal indenter causes median/radial crack formation in glasses with either ion-exchange profile, CS=849 MPa and DOL=43 μm or CS=366 MPa and DOL=100 μm. Both ion-exchanged depths of layer are sufficient to prevent the flaw from 500 gf indentation from entering the central tension region. As the indentation load is increased to 750 gf, however, failure occurs in 50% of 10 indents made in the glass having CS=849 MPa and DOL=43 μm. Parts that fail have indentation flaw depths exceeding the depth of layer. At the 750 gf indentation load, none the parts with CS=366 MPa and DOL=100 μm fail, since the flaw depth does not exceed the DOL.

ceramic phase, and is strengthened by ion exchange. Such glass ceramics include those in which the ceramic phase comprises or consists of β-spodumene, β-quartz, nepheline, kalsilite, carnegieite, combinations thereof, and the like.

In another embodiment, the alkali aluminosilicate glass comprises: from about 64 mol % to about 68 mol % $SiO_2$; from about 12 mol % to about 16 mol % $Na_2O$; from about 8 mol % to about 12 mol % $Al_2O_3$; from 0 mol % to about 3 mol % $B_2O_3$; from about 2 mol % to about 5 mol % $K_2O$; from about 4 mol % to about 6 mol % MgO; and from 0 mol % to about 5 mol % CaO; wherein: 66 mol %≤$SiO_2$+$B_2O_3$+CaO≤69 mol %; $Na_2O$+$K_2O$+$B_2O_3$+MgO+CaO+SrO>10 mol %; 5 mol %≤MgO+CaO+SrO≤8 mol %; ($Na_2O$+$B_2O_3$)−$Al_2O_3$≤2 mol %; 2 mol %≤$Na_2O$−$Al_2O_3$≤6 mol %; and 4 mol %≤($Na_2O$+$K_2O$)−$Al_2O_3$≤10 mol %.

In another embodiment, the alkali aluminosilicate glass comprises: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O$+$Na_2O$+$K_2O$≤20 mol % and 0 mol %≤MgO+CaO≤10 mol %.

In another embodiment, the alkali aluminosilicate glass comprises $SiO_2$ and $Na_2O$, wherein the glass has a temperature $T_{35\ kp}$ at which the glass has a viscosity of 35 kilo poise (kpoise), wherein the temperature $T_{breakdown}$ at which zircon breaks down to form $ZrO_2$ and $SiO_2$ is greater than $T_{35\ kp}$. In some embodiments, the alkali aluminosilicate glass comprises: from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and 0 mol % to about 3 mol % CaO.

In other embodiments, the alkali aluminosilicate glass comprises at least 50 mol % $SiO_2$ and at least one modifier selected from the group consisting of alkali metal oxides and alkaline earth metal oxides, wherein [($Al_2O_3$ (mol %)+$B_2O_3$ (mol %))/(Σ alkali metal modifiers (mol %))]>1. In some embodiments, the alkali aluminosilicate glass comprises: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$.

In another embodiment, the alkali aluminosilicate glass comprises $SiO_2$, $Al_2O_3$, $P_2O_5$, and at least one alkali metal oxide ($R_2O$), wherein 0.75≤[($P_2O_5$ (mol %)+$R_2O$ (mol %))/

TABLE 2

Indentation of glasses with 100° 4-sided pyramidal indenter tip. Sharp indentation greatly reduces median/radial cracking threshold. Resistance to part failure increases for deeper DOL by containing the indentation flaws under compression.

| Compressive Stress (MPa) | Depth of Layer (microns) | % of indents with median/radial cracks at 500 gf | % of indents that cause failure by complete separation at 500 gf | % of indents with median/radial cracks at 750 gf | % of indents that cause failure by complete separation at 750 gf |
|---|---|---|---|---|---|
| 849 | 43 | 100 | 0 | 100 | 50 |
| 366 | 100 | 100 | 0 | 100 | 0 |

In some embodiments, the glass material described herein is a glass ceramic having a silicate glassy phase and a $M_2O_3$ (mol %)]≤1.3, where $M_2O_3$=$Al_2O_3$+$B_2O_3$. In some embodiments, the alkali aluminosilicate glass comprises:

from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$; and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12% $P_2O_5$; and from about 12 mol % to about 16 mol % $R_2O$.

In still other embodiments, the alkali aluminosilicate glass comprises at least about 5 mol % $P_2O_5$, wherein ($M_2O_3$ (mol %))/$R_xO$ (mol %))<1, wherein $M_2O_3=Al_2O_3+B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, $MgO$, $CaO$, $SrO$, $BaO$, and $ZnO$. In some embodiments, the glass comprises 0 mol % $B_2O_3$.

In still another embodiment, the alkali aluminosilicate glass comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein $-340+27.1.Al_2O_3-28.7.B_2O_3+15.6.Na_2O-61.4.K_2O+8.1.(MgO+ZnO) \geq 0$ mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO.

In some embodiments, the alkali aluminosilicate glasses described herein are substantially free of (i.e., contain 0 mol % of) of at least one of lithium, boron, barium, strontium, bismuth, antimony, and arsenic.

In some embodiments, the alkali aluminosilicate glasses described herein are down-drawable by processes known in the art, such as slot-drawing, fusion drawing, re-drawing, and the like, and has a liquidus viscosity of at least 130 kilopoise.

In another aspect, a method of strengthening a glass material, such as those described hereinabove, is also provided. The method includes providing an ion exchange medium that comprises a first cation and a second cation. The first cation is present in the ion exchange medium in a first concentration and the second cation is present in the ion exchange medium in a second concentration, where the first concentration is greater than the second concentration. The first cation is larger than the second cation. In some embodiments, the ion exchange medium is an ion exchange bath such as, for example, a molten salt bath comprising salts of the first cation and, optionally, the second cation.

In some embodiments the method includes providing an ion exchangeable glass material comprising the second cation. The glass material may be a glass ceramic or an alkali aluminosilicate glass such as those previously described hereinabove.

Second ions in the glass material are ion exchanged with first ions in the ion exchange medium; i.e., first ions from the ion exchange medium replace second ions in the glass. In those embodiments in which the ion exchange medium is an ion exchange bath, ion exchange takes place by immersing the glass material in the ion exchange bath. As a result of the ion exchange step, a layer under compressive stress (compressive layer) extending from a surface of the glass material to a depth of layer of at least 75 μm is formed and the ion exchanged glass material has a Vickers crack initiation threshold of at least about 10 kgf and, in some embodiments, at least 20 kgf.

In some embodiments, the first cation is the monovalent $K^+$ cation and the second cation is the monovalent $Na^+$ cation. Here, the ion exchange bath may contain sodium and potassium salts. The ion exchange bath, for example, may contain 89-94 wt % potassium nitrate and 6-11 wt % sodium nitrate. The first and second cations may also be selected from the other alkali metal cations as well, provided that the first cation is larger than the second cation.

The ion exchange step may, in some embodiments, be carried out at temperatures ranging from about 390° C. up to about 450° C. for times ranging from about one hour up to about 24 hours and, in some embodiments, from about 8 hours up to about 24 hours.

The articles formed from the glass materials described herein may be used as viewing windows, touch screens, external housings, and the like for various electronic devices. These electronic devices include, but are not limited to, portable communication and entertainment devices (e.g., telephones, music players, DVD players, etc.), laptop computers, televisions, and the like.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. An article comprising a glass material, the glass material having a thickness of less than 1.5 mm, a compressive layer extending from a surface of the glass material to a depth of layer of at least 75 microns, wherein the compressive layer is under a compressive stress of at least 250 MPa, and wherein the glass material is a glass ceramic comprising a silicate glassy phase and a ceramic phase.

2. The article of claim 1, wherein the glass material comprises an inner central region under a tension of up to 75 MPa.

3. The article of claim 2, wherein the glass material has a Vickers crack initiation threshold of at least 5 kgf.

4. The article of claim 3, wherein the glass material has a Vickers crack initiation threshold of at least 10 kgf.

5. The article of claim 4, wherein the Vickers crack initiation threshold is at least 20 kgf.

6. The article of claim 2, wherein the compressive stress is at least 900 MPa.

7. The article of claim 2, wherein [($Al_2O_3$ (mol %)+$B_2O_3$ (mol %))/(Σ alkali metal modifiers (mol %))]>1.

8. The article of claim 1, wherein the glass material has a Vickers crack initiation threshold of at least 5 kgf.

9. The article of claim 8, wherein the glass material has a Vickers crack initiation threshold of at least 10 kgf.

10. The article of claim 9, wherein the Vickers crack initiation threshold is at least 20 kgf.

11. The article of claim 10, wherein the compressive stress is at least 900 MPa.

12. The article of claim 8, wherein [($Al_2O_3$ (mol %)+$B_2O_3$ (mol %))/(Σ alkali metal modifiers (mol %))]>1.

13. The article of claim 1, wherein the compressive stress is at least 900 MPa.

14. The article of claim 1, wherein [($Al_2O_3$ (mol %)+$B_2O_3$ (mol %))/(Σ alkali metal modifiers (mol %))]>1.

15. The article of claim 14, wherein the ceramic phase comprises at least one of β-spodumene, β-quartz, nepheline, kalsilite, carnegieite, and combinations thereof.

16. The article of claim 14, wherein the ceramic phase comprises β-spodumene.

17. The article of claim 14, wherein the ceramic phase comprises β-quartz.

18. The article of claim 1, wherein the ceramic phase comprises at least one of β-spodumene, β-quartz, nepheline, kalsilite, carnegieite, and combinations thereof.

19. An article comprising a glass material, the glass material having a thickness of less than 1.5 mm, a compressive layer extending from a surface of the glass material to a depth of layer of at least 75 microns, wherein the compressive layer is under a compressive stress of at least 250 MPa, wherein the glass material is a glass ceramic comprising a silicate glassy phase and a ceramic phase, and wherein the ceramic phase comprises β-spodumene.

20. An article comprising a glass material, the glass material having a thickness of less than 1.5 mm, a compressive layer extending from a surface of the glass material to a depth of layer of at least 75 microns, wherein the compressive layer is under a compressive stress of at least 250 MPa, wherein the glass material is a glass ceramic comprising a silicate glassy phase and a ceramic phase, and wherein the ceramic phase comprises β-quartz.

21. The article of claim 1, wherein the ceramic phase comprises nepheline.

22. The article of claim 1, wherein the silicate glassy phase comprises an alkali aluminosilicate glass.

23. An electronic device, comprising the article of claim 1.

24. The electronic device of claim 23, comprising a viewing window, a touch screen, or an external housing, wherein the glass material forms at least a portion of at least one of the viewing window, the touch screen, or the external housing.

* * * * *